(12) United States Patent
Curt et al.

(10) Patent No.: US 8,037,969 B2
(45) Date of Patent: Oct. 18, 2011

(54) METHOD AND APPARATUS FOR A DRIVE-THRU PRODUCT DELIVERY VERIFIER

(75) Inventors: Walter Curt, Harrisonburg, VA (US); Christopher Mullins, Penn Laird, VA (US)

(73) Assignee: Power Monitors, Inc., Mount Crawford, VA (US)

( * ) Notice: Subject to any disclaimer, the term of this patent is extended or adjusted under 35 U.S.C. 154(b) by 506 days.

(21) Appl. No.: 12/043,267

(22) Filed: Mar. 6, 2008

(65) Prior Publication Data

US 2008/0217108 A1 Sep. 11, 2008

Related U.S. Application Data

(60) Provisional application No. 60/893,272, filed on Mar. 6, 2007.

(51) Int. Cl.
*G06Q 30/00* (2006.01)
*G06Q 50/00* (2006.01)
(52) U.S. Cl. ............................ 186/41; 705/22; 705/23
(58) Field of Classification Search ............... 186/41, 186/53, 59; 705/15, 306; 434/127, 433
See application file for complete search history.

(56) References Cited

U.S. PATENT DOCUMENTS

| 4,800,492 | A | 1/1989 | Johnson et al. |
| 5,083,638 | A | 1/1992 | Schneider |
| 5,488,202 | A | 1/1996 | Baitz et al. |
| 5,898,158 | A | 4/1999 | Shimizu et al. |
| 5,937,386 | A * | 8/1999 | Frantz .............................. 705/15 |
| 5,939,974 | A * | 8/1999 | Heagle et al. ............. 340/286.09 |
| 6,115,695 | A | 9/2000 | Kern |
| 6,384,348 | B1 * | 5/2002 | Haga et al. .................. 177/25.15 |
| 6,687,680 | B1 | 2/2004 | Iguchi et al. |
| 6,842,719 | B1 | 1/2005 | Fitzpatrick et al. |
| 6,866,193 | B1 * | 3/2005 | Shimizu et al. ............... 235/383 |
| 7,177,824 | B2 | 2/2007 | Sabongi et al. |
| 2002/0082924 | A1 | 6/2002 | Koether |
| 2003/0069796 | A1 | 4/2003 | Elwood et al. |
| 2004/0210621 | A1 | 10/2004 | Antonellis |
| 2005/0049921 | A1 | 3/2005 | Tengler et al. |
| 2005/0216349 | A1 | 9/2005 | Vaseloff et al. |
| 2005/0256774 | A1 | 11/2005 | Clothier et al. |
| 2006/0218057 | A1 | 9/2006 | Fitzpatrick et al. |

* cited by examiner

*Primary Examiner* — Mark Beauchaine
(74) *Attorney, Agent, or Firm* — K&L Gates LLP

(57) ABSTRACT

A system for improving the efficiency of drive-through delivery systems is provided. The system can provide complete error tracking and feedback; however, partial or no error tracking and/or feedback can be provided if desired. Errors in order fulfillment can be reduced. Detailed information on product weight and delivery timing can be provided. By analyzing the weight distributions of each food item or any other suitable measurements, production quality and consistency may be monitored. By analyzing the delivery times for each food item type or any other suitable measurements, production efficiency and restaurant work flow may be measured.

18 Claims, 3 Drawing Sheets

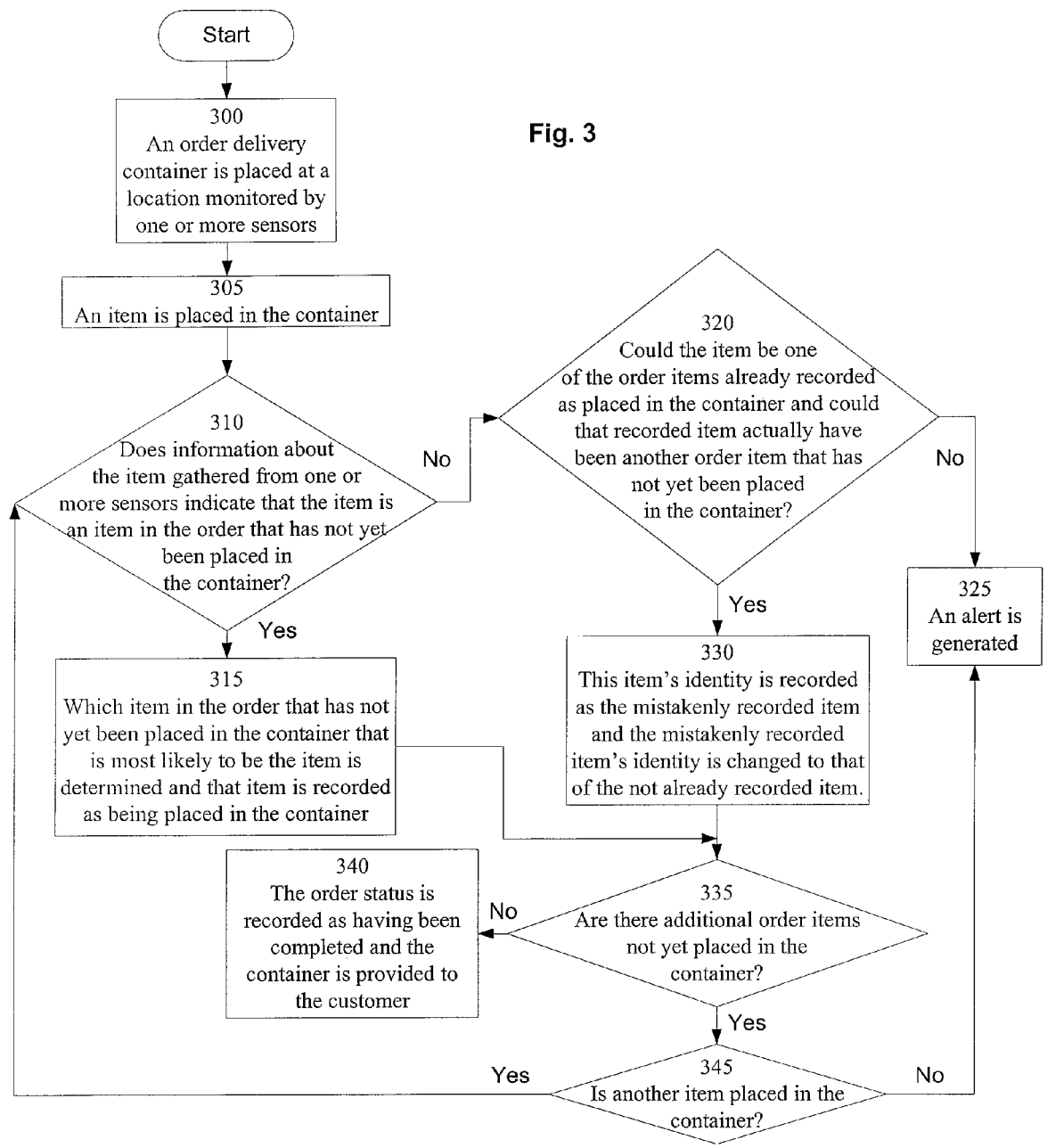

METHOD AND APPARATUS FOR A DRIVE-THRU PRODUCT DELIVERY VERIFIER

RELATED APPLICATIONS

This application claims the benefit of U.S. Provisional Patent Application Ser. No. 60/893,272 entitled "METHOD AND APPARATUS FOR A DRIVE-THRU PRODUCT DELIVERY VERIFIER" and filed on Mar. 6, 2007, the entire contents of which is hereby incorporated by reference.

BACKGROUND

The drive-thru window is ubiquitous among fast food restaurants. One frequent problem with this system is the customer receiving an incorrect order. If the customer drives off before fully checking the order, it is frustrating and time-consuming to return and have it corrected. If the customer stays at the drive-thru window long enough to completely check all received items, everyone else in line must wait, significantly reducing overall throughput. Frequent errors in received items can result in lost customers.

Much has been done to optimize the drive-thru system, and in particular to improve accuracy. Many restaurants now include an outdoor display to show the order as entered by the cashier—this way the customer can verify that the order was entered correctly. This does help reduce one error mechanism—incorrect order entry—but doesn't help if the cashier bags the order incorrectly, or if items were wrapped incorrectly. Some restaurants have automatic drink machines. These fully automatic machines handle all drinks associated with an order, reducing the chance of error, but only for drinks. Drive-thru systems have been rearranged to include two windows—a cashier at one window, and a food delivery person at a second window. This improves throughput, and also reduces errors by reducing the number of disparate tasks each worker must perform. The cashier function is even being outsourced to off-site locations, where orders may be received without distractions from the restaurant operations. This results in improved order-taking accuracy, but still does not fully address mistakes in bagging the order and delivering it to the customer.

Another problem with incorrectly assembled and delivered drive-thru orders is the lack of accountability. With the current system, if a customer returns due to an incorrect order, there is no mechanism to track what the error was, or who was responsible.

SUMMARY

A system for improving the efficiency of drive-through delivery systems is provided. One embodiment provides complete error tracking and feedback; however, partial or no error tracking and/or feedback can be provided if desired. In another embodiment, detailed information on product weight and delivery timing is provided. By analyzing the weight distributions of each food item or any other suitable measurements, production quality and consistency may be monitored. By analyzing the delivery times for each food item type or any other suitable measurements, production efficiency and restaurant work flow may be measured.

In one embodiment, the system includes a weigh station and a control/display station. One or more weigh stations include a sensitive electronic scale connected to a loading platform; however, the weigh stations can include any suitable type of scale. Preferably, these are networked together with a central controlling station; however, such a network is not required. The control station can be optionally connected to a larger network, and also can receives inputs from other systems, such as the cash register network, automatic drink dispensers, cooking devices, and computers located on- or off-site if desired; however, such functionality is not required.

In one embodiment, a single weigh station is located at the drive-thru window. The weigh station can also incorporate the control station; however, such a configuration is not required. Preferably, at the beginning of an order fulfillment, an empty bag is placed on the scale; however, orders can be fulfilled with the system in any suitable manner. As items are placed in the bag, the weigh station registers the time and change in total weight. In one embodiment, these weight changes are a primary input into the control station, which also preferably receives a complete inventory of the order received from the cash register; however, the control station can receive any suitable input from any suitable source. The control station preferably matches the weight change data with the known weights or weight ranges of the items in the order. If there is a discrepancy, or the bag is removed before the weight is close to, equal to or within a range of the expected amount for the entire order, an alert is generated. Preferably, the alert alerts the cashier to at least one of many types of errors, in particular the most common—a missing item; however, the alert can alert any suitable person to any suitable error or condition (e.g., the condition of the order being correctly filled).

In one embodiment, the accumulated data (e.g., the specific weights and timing measured by the weigh stations or any other suitable date) can be used to train the system to produce more accurate results; however, such training is not required. In another embodiment, accumulated data can be analyzed to reveal inefficiencies and problems in the restaurant operation; however, such analysis is not required.

Additional features and advantages are described herein, and will be apparent from, the following Detailed Description and the figures.

BRIEF DESCRIPTION OF THE FIGURES

FIG. 3 is a flow diagram of a process of checking the accuracy of fulfillment of an order by checking each item in accordance with one embodiment.

DETAILED DESCRIPTION

Figure 1:
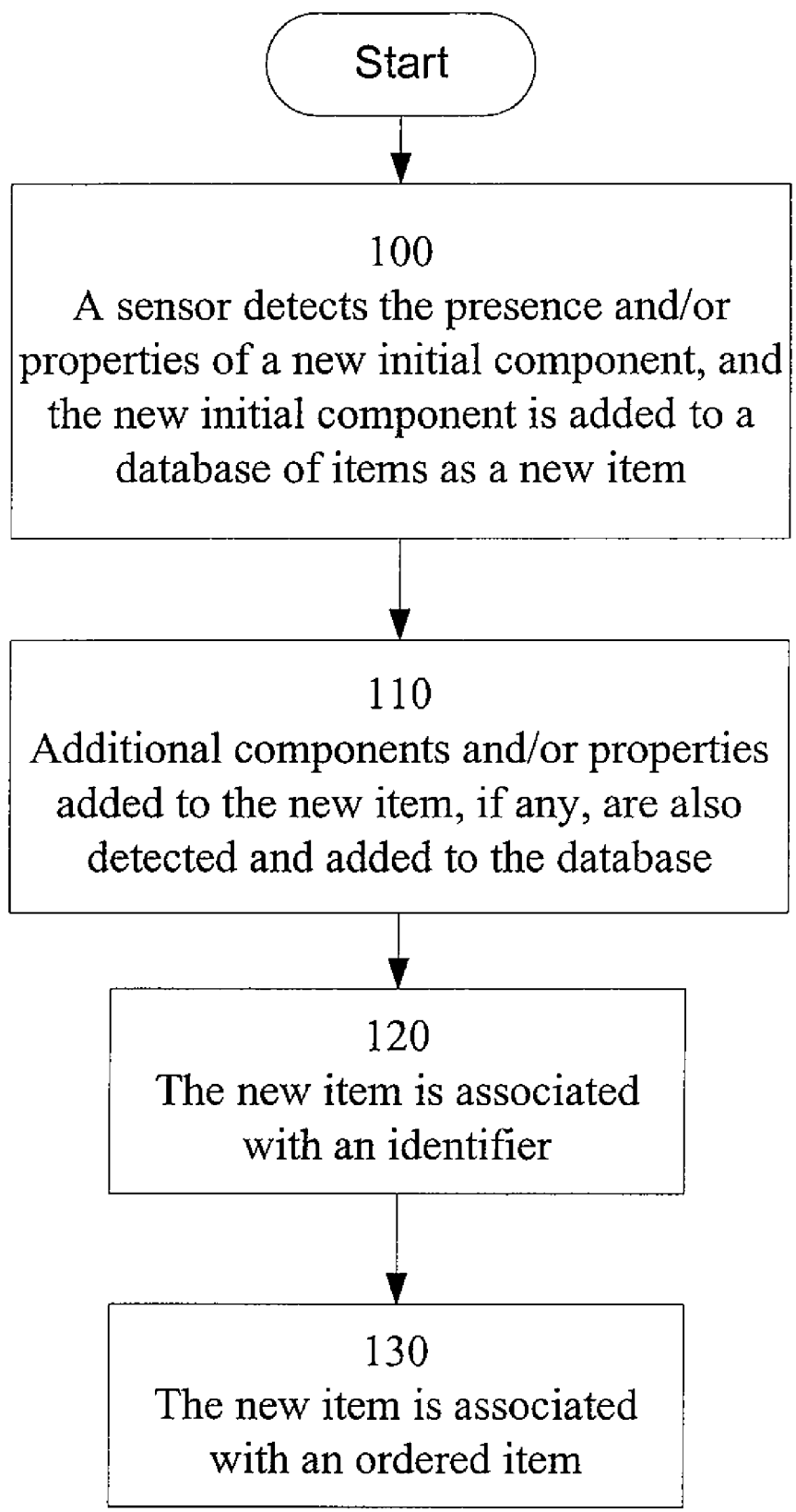
FIG. 1 is a flow diagram of a process of preparing an item to be used in fulfilling an order in accordance with one embodiment.

In one embodiment, the system includes a single device which integrates the weigh and control station functions. In other embodiments, the station functions are separated into one or more simple weigh stations, and/or one or more controllers. The controller station may be at an off-site location or any other suitable location. In another embodiment, the system includes a separate display unit, which displays the order fulfillment status to the worker preparing the order. In still another embodiment, a second display unit is located at a remote location or any other suitable location, for supervisor monitoring or any other suitable purpose.

Weigh Station Features in One Embodiment

In one embodiment, the scale has good resolution and repeatability; however, the scale can have any suitable features, qualities or configuration. In one embodiment, the weigh station has the ability to receive feedback from the control station. In such an embodiment, accuracy may not as important as in other embodiments; however various embodiments can include any suitable accuracy levels. In one embodiment, using feedback on every order or any suitable set of orders or other values, the scale can recalibrate itself continuously, periodically, occasionally or at any other suitable time; however, self recalibration is not required.

In one embodiment, the scale is easily wiped down, and weather resistant; however, neither of these properties are required. In one embodiment, an auto-tare function that operates between orders helps to reduce errors due to accumulated dirt and residue; however, an auto-tare function is not required or can be operated at any suitable interval or time.

In one embodiment, the scale's impulse response is optimized so it doesn't undershoot or overshoot excessively, but still settles quickly to the correct value; however, the impulse response can have any suitable performance. In one embodiment, an active feedback system is provided to properly shape the electromechanical impulse and step response to optimize reading time; however, such a system can operate in any suitable manner and is not required. In one embodiment, the feedback parameters can be adjusted dynamically depending on the weight of items in the order and which items are already on the scale. This feedback may local, or come from the control station.

In one embodiment, the weigh station includes a mechanism for communicating with the control station.

Control Station

In one embodiment, the control station receives raw weight data from the weigh station and/or other sensors. In another embodiment, the station also receives order data from the restaurant cashier system. The connection with the cash register may be through a local port (e.g. RS-232 or RS-485) wired directly between the two devices or through a local or wide-area network or by any other suitable communications system.

In one embodiment, the control station receives initial product weight information. Preferably, this information is used in the calculations to determine if orders have been filled correctly; however, the information can be used in any suitable manner and order accuracy can be determined in any suitable manner. In one embodiment, the initial product data may be updated dynamically by the controller based on measurements from the weigh station and knowledge of the actual order contents from the cash register.

In one embodiment, the control station includes a real-time clock. The clock enables time-stamping of data from the weigh stations or any other suitable actions involving time. In another embodiment, the control station receives time information from an external clock source (e.g. GPS receiver), or through a LAN (e.g. using the Network Time Protocol via TCP/IP) or from any other suitable time information source. In one embodiment, even without an external clock reference, internal timers may be used in conjunction with weigh station data to compute statistics and log data.

In one embodiment, the control station includes memory for data logging. Low-level data, such as raw weigh station weight signals, inputs from cash register and other external sources, etc. may be logged; however, it should be understood that any suitable data can be logged. In one embodiment, aggregate statistics computed from the data are logged. In one embodiment, any or all data which may be logged may also be transmitted to another controller or any other suitable external device through a network connection or any other suitable communications system.

Other Inputs

In one embodiment, the control station connects to other sensors. If RFID tags or other suitable devices and/or identifiers (e.g., bar codes, 2-D bar codes, etc.) are embedded in or placed upon product wrappers (e.g. a cheeseburger wrapper, or French fry box), these may be read when the item is placed in the bag. In one embodiment, the RFID reader is located in the weigh station platform, so no user action is required to read the tags; however, the reader can be located in any suitable location and require any suitable amount of user action. In one embodiment, multiple readers are used to insure a high read success rate. In one embodiment, since the control station is sensing change in weight, 100% tag read success is not required. In one embodiment, the possibility of a mis-wrapped item is considered by the controller, causing the condition to be flagged as an error; however, such consideration is not required.

In one embodiment, one or more heat sensors are located on the weigh station. Preferably, these sensors would be in contact with the floor of the bag, and would measure local bag floor temperature; however, the sensors can be at any suitable location and can measure any suitable value. In one embodiment, a grid of sensors detects a temperature XY profile of the bag floor. In one embodiment, the controller can estimate food temperature given the item identity estimates and measured bag floor temperatures. With known thermal conduction properties of each food item, overall item temperatures may be modeled and tracked, and suitable warnings given if the calculated food temperature for any item exceeds or falls below acceptable limits; however, such capability is not required. In one embodiment, the temperature of an item is determined (e.g., by an infrared thermometer or any other suitable measuring device) when the item is placed in the bag, box or other container. Similar to the weighs or weight ranges associated with each item, a temperature or temperature range is associated with each item. If the temperature detected does not match the expected temperature or temperature range, an alert is generated. In one embodiment, the temperature and weight measurements are used in conjunction to determine whether the item is correct and/or which item from an order was placed in the container. In still another embodiment, one or more additional sensors (e.g., bar code readers the check item wrappers or boxes, RFID readers, etc.) are also used in conjunction with the weight and temperature sensors to determine the correctness and/or identity of an item.

In one embodiment, one or more video cameras or any other suitable visual/light or electromagnetic sensor devices are used in the item identification process at the control station. In one embodiment, image recognition software provides identity estimates for each item, along with variance or uncertainty estimates. These estimates feed into the overall item identification estimate, along with weight, RFID tag read (or lack of read), or any other suitable data if available. In one embodiment, the camera incorporates infrared imaging to estimate item temperature or corroborate estimated bag temperature. In another embodiment, food wrappers or containers may be marked with special UV or IR active inks or any other suitable ink or substance, making product identification easier for the automatic imaging system, but preferably having little visible trace to customers; however, it should be noted such inks or substances can have any suitable or desired appearance to anyone. In one embodiment, these cameras are shared with surveillance and security systems.

In various other embodiments, various other suitable sensors of any suitable type can provide data to the control station. In some embodiments, the data is used to augment the product identification or state estimation (e.g. temperature, contents) calculations. Such other sensors include, but are not limited to millimeter RADAR and ultrasound systems, capacitive sensing, visible light transmission and reflectivity sensors (e.g. lights shining through the bag, or visible light measured through the bag floor).

In one embodiment, sensors (e.g., video sensors with image recognition software) are also used to track item production to ensure accuracy. For example, as a hamburger is prepared, one or more sensors detect how the hamburger is being prepared. If the hamburger is already assigned to an order, the system can determine whether the hamburger is being properly prepared (e.g., toasted or not toasted bun, presences or absence of ketchup, mustard, pickles, onions, lettuce, cheese (including cheese type determination) or any other suitable toppings or ingredients, etc.). Preferably, the item being prepared is tracked in any suitable manner through and from the production area to the order assembly area (e.g., the drive through window); however, such tracking is not required.

In one embodiment, the prepared item is associated with an identifier on a wrapper, box or other item container. As a result, the identifier can be detected as the item is placed in the bag, box or other delivery container to ensure greater accuracy (in combination with or without weight or other property detection). In one embodiment, the identifier is unique; however, in various embodiments the identifier is not unique. Preferably, the identifier is one of a group of identifiers, there being enough identifiers in the group to make it unlikely that any two items being prepared at substantially the same time would have the same identifier; however, there can be any suitable number of identifiers. In one embodiment, the same identifier can be used on two or more items prepared at substantially the same time if the items have distinguishable item containers (e.g., wrappers, boxes, sleeves and/or containers having different shapes, sizes and/or colors).

FIG. 1 illustrates the process of preparing an item in accordance with one embodiment. At block 100, a sensor (e.g., a video camera) detects the presence and/or properties of a new initial component (e.g., a bun, piece or loaf of bread, taco shell, tortilla, pita pocket, or any other suitable initial component), and the new initial component is added to a database of items as a new item. At block 110, additional components and/or properties added to the new item, if any, are also detected and added to the database. At block 120, the new item is associated with an identifier. The identifier is preferably part of or encoded on an item container; however, the identifier can be virtual (e.g., a number associated with the image of the item being tracked in the video image) or be associated with the item in any other suitable manner. Optionally, at block 130, the new item is associated with an ordered item. In various embodiments, the ordered item can be ordered before, during or after the new item is prepared.

Networking

In various embodiments, the weigh stations and controllers, if not combined in an integral device, communicate with each other. In one embodiment, a local communication means, including but not limited to wired protocols such as RS-232, RS-485, CAN, etc., wireless methods such as Bluetooth, ZigBee, WiFi, etc., and/or power line protocols such as INSTEON, HomePlug, or any other suitable communications system is used. In another embodiment, LAN protocols such as Ethernet and TCP/IP or any other suitable protocols may be used. In various embodiments, a combination of methods may also be utilized where practical or desired.

In various embodiments, external communications to restaurant cash register and/or other restaurant networks or any other suitable devices are made with the same techniques or any other suitable techniques.

Operation of One Embodiment

Figure 2:
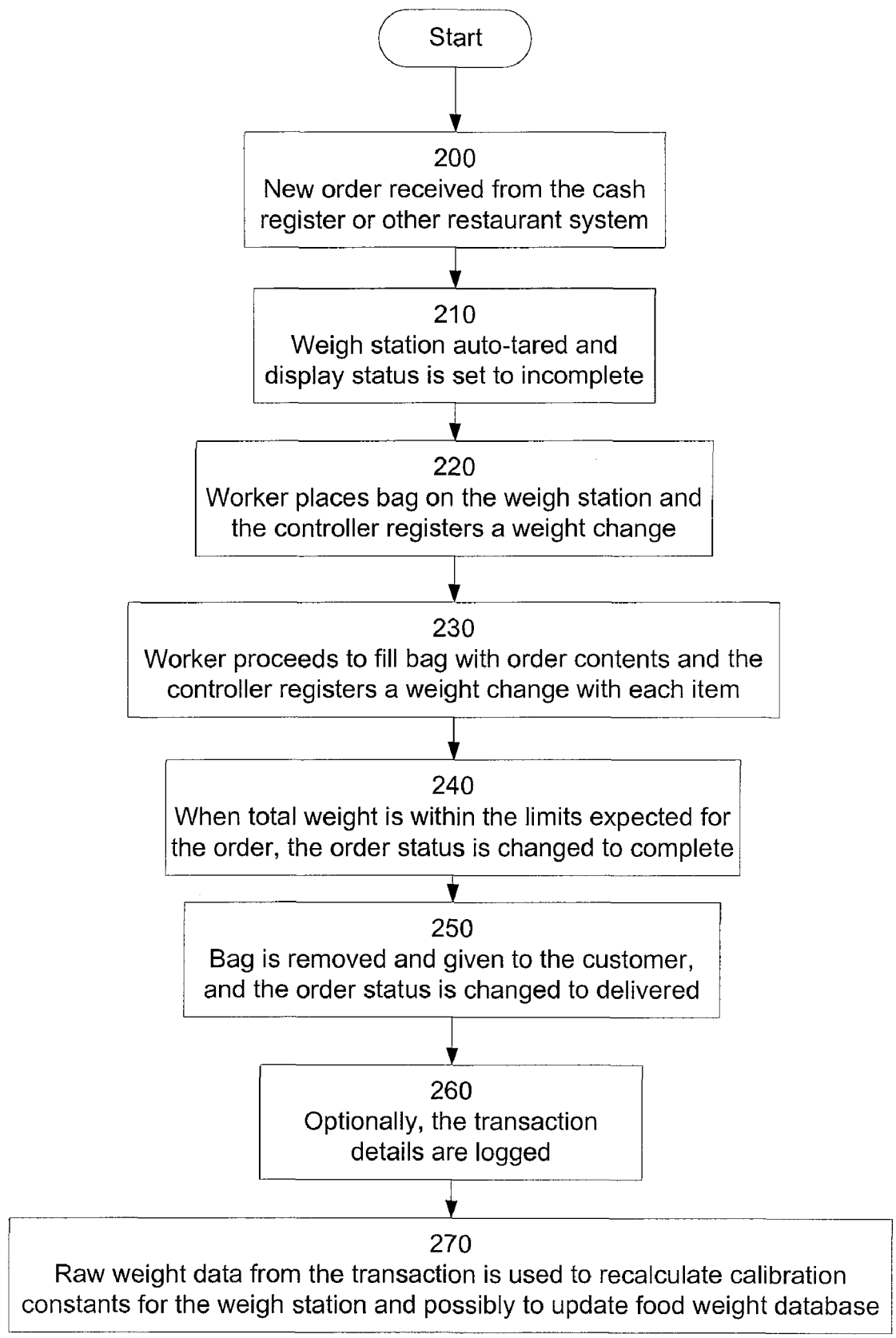
FIG. 2 is a flow diagram of a process of filling an order with a control station in accordance with one embodiment.

FIG. 2 illustrates the process of filling an order with a control station in accordance with one embodiment. At block 200, a new order is received from the cash register or other restaurant system. At block 210, the weigh station is auto-tared so that it reads zero and the display status is set to "Incomplete." At block 220, a worker places a bag on the weigh station and the controller registers a weight change. At block 230, the worker proceeds to fill bag with order contents and the controller registers a weight change with each item. At block 240, when the total weight is within the limits expected for the order, the order status is changed to "Complete." At block 250, the bag is removed and given to the customer, and the order status is changed to "Delivered." At block 260, optionally, the transaction details are logged. At block 270, raw weight data from the transaction is used to recalculate calibration constants for the weigh station and possibly to update food weight database (e.g., updating weights or weight ranges of items based on actual measured values). For example, if the customer does not return to complain of an incorrectly filled order within a period of time (e.g., 10 minutes, 15 minutes, 30 minutes, an hour, a day, or any other suitable amount of time), the system assumes its determination of the correctness of the order was correct. Thus, the data accumulated about the order (such as the actual weight of the items or any other suitable data) can be used to adjust ranges, statistical likelihoods, decision systems (e.g., neural networks that determine an item identity using one or more different sensor readings or other factors) or any other suitable adjustable features of the system.

In one embodiment involving large orders with multiple bags, provisions are made to handle multiple scale loadings in a single customer order. In one embodiment, provisions are also present to handle situations where an order is placed on hold temporarily, changed, or canceled.

In one embodiment, the control station only starts with the expected weight for each possible item. This information is used to compute the total order weight, and if the measured weight is within a tolerance factor, the order is declared "Complete". Given confirmation from the operator that the order is actually correct, the control station can use that measurement as a reference to recalibrate the weigh station, correcting for any accuracy drift. Data from multiple orders can be combined to form a more accurate correction.

In another embodiment, the control system attempts to identify the individual items as they are placed in the bag. This allows the system to halt the bag loading if an incorrect item is detected. Another benefit is more data—if each item is identified, then statistics on product weight and delivery timing may be computed.

In one embodiment, actual weight probability distribution functions (PDFs) for each product item component are known. For example, the PDF for each component of a cheeseburger would be entered into the control station memory. If an order for a cheeseburger (with any combination of components) is received, the controller computes the PDF of the total item, given the known PDFs of the individual components. This is repeated for each item in the order, and a total PDF of the order is computed. Any known scale variances may also be factored in. Limits are computed based on desired probability of error (both false declaration of "Complete", and false declaration of "Incomplete", which may or may not be equal).

In one embodiment, as items are added to the weigh station, the controller may attempt to identify the specific item that was added. Maximum-likelihood estimation techniques could be used, along with conditional probabilities, given the estimations of items already identified. Some or all available sensor data is used to compute an overall identity estimate, using sensor fusion techniques such as fuzzy logic, neural networks, rule systems, etc. As each new item is received, the previous calculations may be redone given the new information, resulting in updated probability estimates for each item in the bag. For example, the system may encounter a first item that could be either of two different items, but that is determined to more likely be one of the items (Item A) rather than another (Item B). Then, the system encounters a second item that could only be Item A. Because the order only includes one each of Item A and Item B, the system may update its previous identification of the first item to now reflect that the first item is Item B.

FIG. 3 illustrates order fulfillment accuracy checking by checking each item in accordance with one embodiment. At block 300, an order delivery container (e.g., a bag, sack, box or any other suitable container) is placed at a location monitored by one or more sensors (e.g., weight scale, optical sensor, heat sensor, etc.). At block 305, an item is placed in the container. At block 310, it is determined whether information about the item gathered from one or more sensors (e.g., the item's weight, temperature, size, shape, coloration and/or identifier or any other suitable information) indicates that the item is an item in the order that has not yet been placed in the container. If the information indicates that the item is an item in the order that has not yet been placed in the container, at block 315, which item in the order that has not yet been placed in the container that is most likely to be the item is determined and that item is recorded as being placed in the container and the process continued at block 335.

If the information indicates that the item is not an item in the order that has not yet been placed in the container, at block 320, it is determined whether the item could be one of the order items already recorded as placed in the container and whether that recorded item could actually have been another order item that has not yet been placed in the container. If the item could not be one of the order items already recorded as placed in the container or no such recorded item could actually have been another order item that has not yet been placed in the container, at block 325, an alert is generated. If the item could be one of the order items already recorded as placed in the container and that recorded item could actually have been another order item that has not yet been placed in the container, at block 330, this item's identity is recorded as the mistakenly recorded item and the mistakenly recorded item's identity is changed to that of the not already recorded item and the process continues at block 335.

At block 335, it is determined if there are additional order items not yet placed in the container. If there are no additional items to be placed in the container, at block 340, the order status is recorded as having been completed and the container is provided to the customer. If there are additional order items not yet placed in the bag, at block 345, it is determined whether another item is placed in the container. If another item is placed in the container, the process repeats at block 310. If another item is not placed in the container, the process continues at block 325.

In one embodiment, an order for placing items in a container is provided. The order can be any suitable order, including those which place more easily stacked items towards the bottom of the container. The ordering forces the person fulfilling the order to pay closer attention to which items are placed in the container. Further, the ranges of acceptable values for sensor readings for the item being placed in the bag are likely more narrow because the system is expecting a specific item rather than any one of possibly several items. As a result, order filling errors can be detected and corrected more quickly.

In one embodiment, when the total weight is within computed limits, the status is changed from "Incomplete" to "Complete" or any other suitable indications. When the transaction is finished, the final item identification estimates are used to update the PDFs of each item in the database (weighted by the identification uncertainty). Also, the weight and timestamp of each item's placement in the bag (along with variance estimates) are optionally logged, and transmitted through the LAN for further processing and storage.

In one embodiment, statistics are computed from the individual product weights and arrival times in the bag. The weight for each item can indicate production quality (e.g. adherence to standard food construction such as quantity of fries in a fry container, amount of lettuce in a taco, etc.). A high variance may indicate poor consistency, and an incorrect mean value may indicate a deviation from the standard product construction.

In one embodiment, knowing the exact arrival time of each item in the bag enables the restaurant to determine what items cause delays in order fulfillment, and find bottlenecks in the work flow, how they vary by time of day, busy times, etc. Further, an analysis by shift can spot employees that need improvement.

In one embodiment, by analyzing the most frequent bagging errors, the restaurant can identify steps to prevent or minimize them.

Although this system is primarily described as operating at a restaurant drive-thru window, it is apparent that it may be extended to other food delivery and production areas or any other suitable delivery systems. For example, in various embodiments weigh stations may be placed at restaurant counters or any other suitable locations, so walk-in customer orders are also included in the statistics, and checked for errors. In other embodiments, weigh stations may also be placed at strategic points in the food production area to gather more statistics, and aid in the identification process by control stations. It is also apparent that the same weight analysis and production tracking may be performed on items other than food. In general, any process that involves the mixing of disparate items or any other suitable items into a common container may be analyzed with this invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An order verification system comprising:
a processor comprising a determiner and a learning unit;
an order reception unit configured to receive a multi-item order and to transmit an item order signal to the processor;
a detection unit configured to automatically detect the collection of items to fill the order and to transmit an item collection signal to the processor;
the processor configured to compare the order and collection signals to determine whether the correct items were collected to fill the order;

the determiner configured to determine, if an error in the collected items is not detected within a predetermined period of time following removal of the items from the detection unit, that the automatic detection of collected items to fill the order was performed correctly; and a learning unit configured to adjust one or more parameters associated with the automatic detection of collected items in accordance with the determination that collection of the correct items to fill the order was performed correctly.

2. The order verification system of claim 1, wherein the detection unit includes:

a scale configured to weigh one or more of the collected items.

3. The order verification system of claim 1, wherein the detection unit includes:

a scanner configured to scan for an identifier on one or more of the collected items.

4. The order verification system of claim 1, further comprising:

a second detection unit configured to detect an initial item component;

said processor comprising an assignment unit configured to assign an item identifier to the initial item component, wherein the second detection unit is further configured to detect one or more additional item components being associated with the initial component; and a recordation unit configured to record the association of the one or more additional item components with the initial item component.

5. The order verification system of claim 4, further comprising:

a third detection unit configured to detect one or more properties of the initial component or any of the one or more additional item components; and the processor further comprising a second recordation unit configured to record the detected one or more properties.

6. The order verification system of claim 1, wherein the detection unit includes: a thermometer configured to measure the temperature of one or more of the collected items.

7. The order verification system of claim 1, wherein the detection unit includes:

an ordering unit configured to determine an ordering for placement of the plurality of items in one or more delivery receptacles;

a prompting unit configured to prompt a user to collect a next item in accordance with the ordering;

and a determiner configured to determine whether an item placed in or on the one or more delivery receptacles is the next item.

8. The order verification system of claim 7, wherein the detection unit further includes:

an alert generator configured to generate an alert, if the item placed in or on the one or more delivery receptacles is not the next item.

9. The order verification system of claim 1, further comprising:

an alert generator configured to generate an alert, if the correct items are not collected to fill the order.

10. A method of filling an order comprising:

receiving a multi-item order via an order reception unit;

collecting items to fill the order via an item detection unit;

transmitting an order signal from the order reception unit to a processor, said processor comprising a memory;

transmitting a collection signal from the item detection unit to the processor;

the processor comparing the order and collection signals to automatically detect whether the correct items are collected to fill the order; and removing the collected items from the detection unit;

the processor determining, if an error in the collected items is not detected within a predetermined period of time following removal of items from the detection unit, that the automatic detection of collected items to fill the order was preformed correctly; and the processor adjusting one or more parameters associated with the automatic detection of collected items in accordance with the determination that collection of the correct items to fill the order was performed correctly.

11. The method of claim 10, wherein the step of automatically detecting includes:

weighing one or more of the collected items.

12. The method of claim 10, wherein the step of automatically detecting includes:

scanning for an identifier on one or more of the collected items.

13. The method of claim 10, wherein the step of collecting items includes:

detecting an initial item component;

assigning an item identifier to the initial item component;

detecting one or more additional item components being associated with the initial component; and recording in the memory the association of the one or more additional item components with the initial item component.

14. The method of claim 13, wherein collecting items further includes:

detecting and recording one or more properties of the initial component or any of the one or more additional item components.

15. The method of claim 10, wherein automatically detecting includes measuring the temperature of one or more of the collected items.

16. The method of claim 10, wherein automatically detecting includes:

determining an ordering for placement of the plurality of items in one or more delivery receptacles; prompting a user to collect a next item in accordance with the ordering; and determining whether an item placed in or on the one or more delivery receptacles is the next item.

17. The method of claim 16, wherein automatically detecting further includes:

generating an alert, if the item placed in or on the one or more delivery receptacles is not the next item.

18. The method of claim 10, further comprising:

generating an alert, if the correct items are not collected to fill the order.

* * * * *